UNITED STATES PATENT OFFICE.

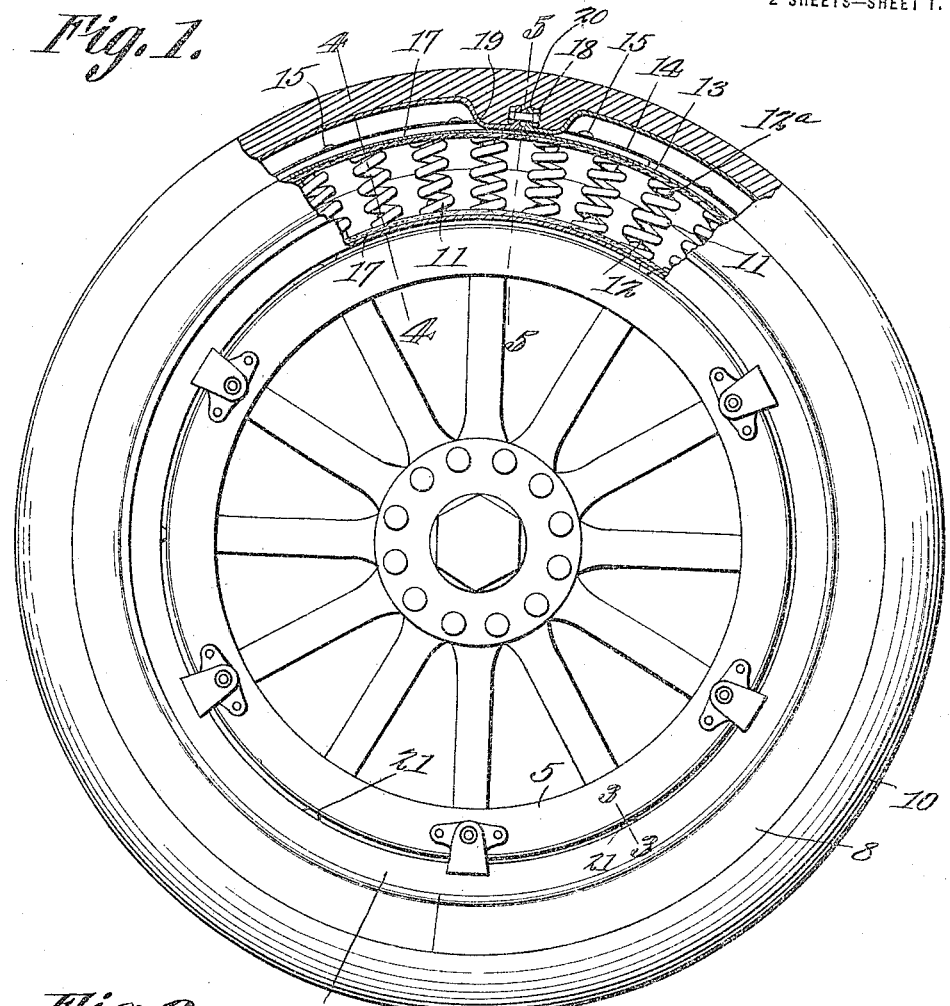
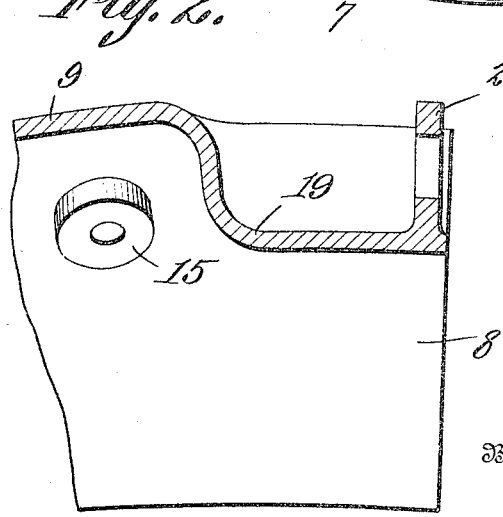
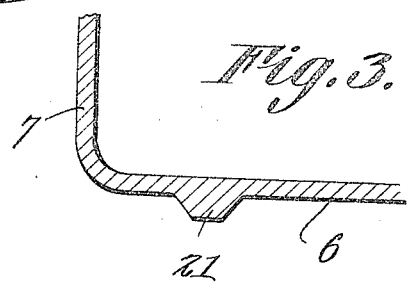

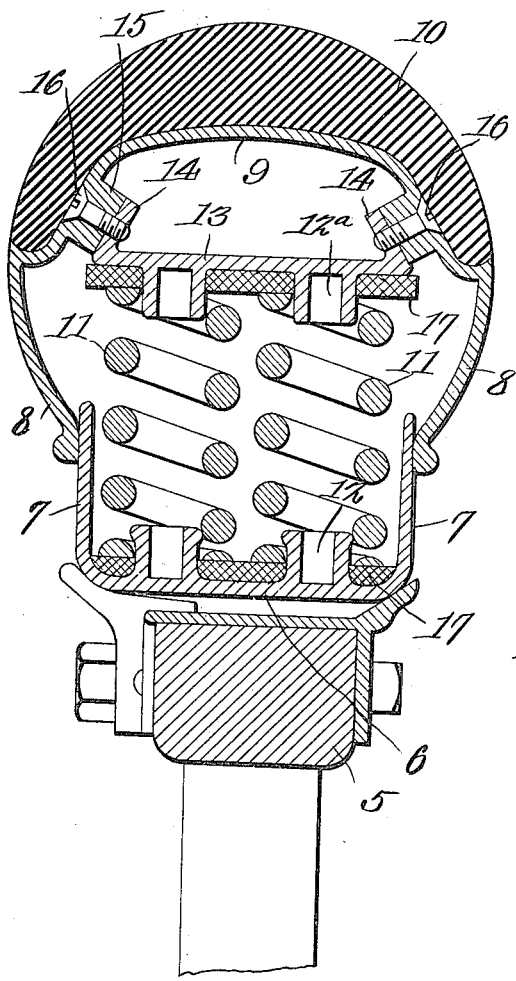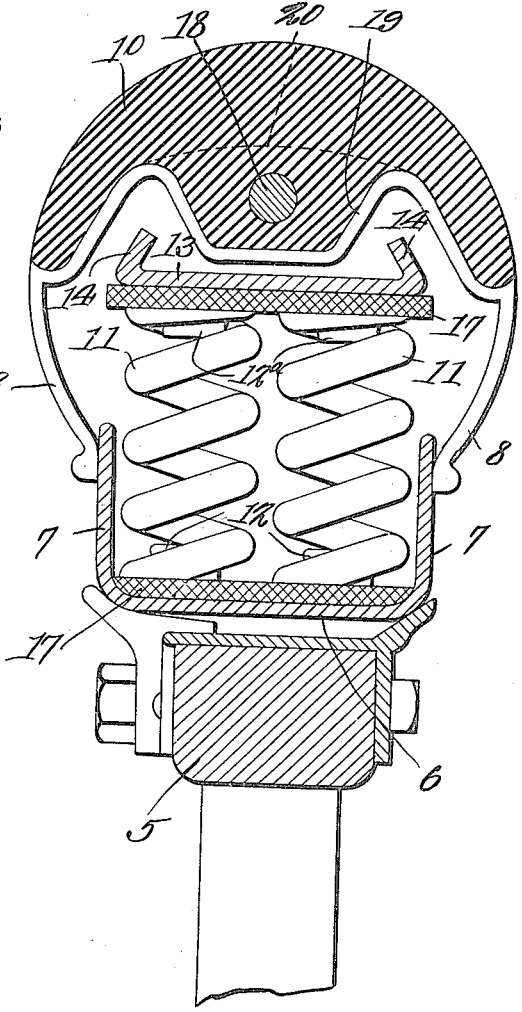

ROLAND R. HARMON, OF BALTIMORE, MARYLAND.

WHEEL-TIRE.

1,231,734.  Specification of Letters Patent.  Patented July 3, 1917.

Application filed April 10, 1917. Serial No. 160,924.

*To all whom it may concern:*

Be it known that I, ROLAND R. HARMON, a citizen of the United States, residing at Baltimore city, State of Maryland, have invented certain new and useful Improvements in Wheel-Tires, of which the following is a specification.

This invention relates to resilient vehicle tires in which the resiliency is obtained by means of metallic springs, the tire being composed of two slidably connected sections between which the springs are interposed.

The invention has for its object to provide a novel and improved tire of the kind stated having a maximum resiliency, and also one which is simple in construction, the parts being few and readily assembled.

In order that the invention may be better understood, reference is had to the accompanying drawing forming a part of this specification, and in said drawing—

Figure 1 is an elevation of the tire, partly in section; Fig. 2 is a detail sectional view of a portion of the tire; Fig. 3 is a detail sectional view taken on the line 3—3 of Fig. 1; Fig. 4 is an enlarged sectional view on the line 4—4 of Fig. 1, and Fig. 5 is an enlarged sectional view on line 5—5 of Fig. 1.

Referring specifically to the drawing, the tire is composed of two relatively slidable sections, the inner section being attached to the felly 5 of the wheel by an ordinary sectional demountable rim or other means which need not be described. The inner section has a base portion 6 and bent up sides 7, it being thus channeled in cross-section. The outer section is arched in cross-section, having side portions 8 slidably engaging the outside of the sides 7 of the inner section. These side portions 8 are connected by a web 9 which is shaped to produce a channel for holding a rubber or other cushion tread 10, said tread being suitably secured in the channel. By the shape of the two sections a hollow tire is had in which are inclosed resilient elements for cushioning the relative movement of the sections, said elements being coiled springs 11 arranged radially between the base 6 and the web 9, and extending in a circular series of two rows entirely around the tire on the inside thereof. The ends of the springs seat over centering lugs 12 and 12ª, respectively, the lugs 12 being on the part 6. The lugs 12ª are on a ring 13 carried by the part 9. This ring has outstanding flanges 14 at its ends located adjacent to the ends of the part 9 and secured to lugs 15 on the inside of the latter, by bolts 16. The ring is thus securely fastened to the outer tire section and forms a rigid abutment for the outer ends of the springs, the base 6 of the inner tire section forming an abutment for the inner ends of the springs. In order to eliminate the noise of friction caused by the compression and expansion of the springs, leather linings 17 are provided for the parts 6 and 13, on which linings the ends of the springs seat. The tread 10 also acts as a cushion in conjunction with the springs to absorb the shock of the road and to insure easy and quiet riding.

In order that the structure may be easily assembled, the outer part of the tire carrying the ring 13 is divided transversely into two sections which are detachably fastened together by bolts 18. At the meeting ends of the sections, the middle portion of the web 9 has depressions 19 and outstanding matching lugs 20 through which the bolts 18 pass, the bolt heads and the nuts screwed on the bolts seating in the depressions. The ring 13 is also in two parts, and the inner section of the tire, or the part which is next to the felly 5 is in one piece. On the side of the part 6 which faces the felly are lugs 21 which assist to retain the tire in place on the wheel.

To assemble the parts, the springs 11 are first placed over the lugs 12 on the part 6, after which the two sections of the outer portion 6 and 9 of the tire, with the ring sections 13 in place, are slipped over the springs and bolted together and after applying the tread 10, the assembly is completed, and the tire is now ready to be put on the wheel. The tread 10 is shaped to extend into the depressions 19 whereby it is prevented from slipping circumferentially on the tire.

I claim:

A resilient tire comprising relatively slidable inner and outer sections, springs interposed between the sections, a tread mounted on the outer section, said outer section being divided transversely and having outstanding matching flanges at its meeting ends and depressions adjacent to said flanges, into which depressions the tread extends, and fasteners passing through the flanges.

In testimony whereof I affix my signature in the presence of two witnesses.

ROLAND R. HARMON.

Witnesses:
E. WALTON BREWINGTON,
HOWARD D. ADAMS.